United States Patent [19]

Caporiccio et al.

[11] 3,944,610

[45] Mar. 16, 1976

[54] N,N-BIS-AMINOALKYLAMIDES OF POLYOXAPERFLUOROALKANDIOIC ACIDS, DERIVATIVES THEREOF AND PROCESS FOR PREPARING SAME

[75] Inventors: Gerardo Caporiccio; Giuliano Carniselli, both of Milan, Italy

[73] Assignee: Montedison S.p.A., Milan, Italy

[22] Filed: Dec. 23, 1974

[21] Appl. No.: 536,951

[30] Foreign Application Priority Data

Dec. 28, 1973   Italy ................................. 32358/73

[52] U.S. Cl. ............ 260/561 HL; 252/8.8; 252/110; 252/390; 260/561 K; 260/561 A; 260/561 B
[51] Int. Cl.$^2$ ..................................... C07C 103/30
[58] Field of Search ..... 260/561 HL, 561 K, 561 A, 260/561 B; 252/8.8, 110

[56] References Cited
UNITED STATES PATENTS

| | | | |
|---|---|---|---|
| 3,442,942 | 5/1969 | Sianesi et al. ................. | 260/561 HL |
| 3,505,411 | 4/1970 | Rice ............................... | 260/561 HL |
| 3,681,413 | 8/1972 | Sweeney et al. ............... | 260/561 HL |
| 3,766,274 | 10/1973 | Anello et al. .................. | 260/561 HL |

*Primary Examiner*—C. Davis

[57] ABSTRACT

Disclosed is a new class of surface active agents having anti-corrosion and oil-repellent properties and which are N,N'-bis-aminoalkylamides of polyoxaperfluoroalkandioic acids, their quaternary ammonium salts, and the oxides of the amines. A process for the production of said compounds is also disclosed.

10 Claims, No Drawings

N,N-BIS-AMINOALKYLAMIDES OF POLYOXAPERFLUOROALKANDIOIC ACIDS, DERIVATIVES THEREOF AND PROCESS FOR PREPARING SAME

THE PRIOR ART

It is known that the conventional surface active agents in which a polar hydrophilic group is linked to a hydrophobic hydrocarbon chain are capable, in the pure state, of decreasing the surface tension of water down to a minimum value of about 25 - 27 dynes/cm.

It has been reported that, using particular mixtures of surface active agents which exhibit synergistic effect, as in the case of mixtures of conventional surface active agents containing lauryl alcohol, values of about 24 dynes/cm were measured (N. L Jarvis and W. A. Zisman, Kirk-Othmer, Encyclopedia of Chemical Technology, 2nd Ed., Vol. 9, p. 721).

Lower values can be obtained with fluorinated surface active agents in which the water-repellent portion of the molecule consists of a perfluoro-alkanic chain ending in —$CF_3$ or —$CF_2H$ groups.

The enhanced effectiveness of the fluorinated surface active agents were interpreted on the basis of the low value of the intermolecular cohesion energy between the perfluoroalkanic chains organized at the liquid-gas interface of the solutions, and is also shown by the low values of the critical wettability surface tension measured on films or molecular layers of the various fluorinated substances.

In particular, studies of surface active agents have shown that the lowest limit value of surface tension obtainable with pure surface active agents in any solvent is the critical wettability surface tension measured on a film or compactly packed monomolecular layer of molecules of the same type as the surface active agent. Consequently, the most important role in determining the minimum value of the surface tension is that of the structure of the water-repellent end-group which constitutes the extreme surface directed toward the gas side. Actually, the critical wettability surface tension values ($\gamma$ c) corresponding to the two different types of structure of the end groups (hydrocarbon structure such as —$CH_3$ with $\gamma$ c = 24 dynes/cm, or fluorinated structure such as —$CF_2H$ with $\gamma$ c = 15 dynes/cm or —$CF_3$ with $\gamma$ c = 6 dynes/cm) are the lower limit values of the surface tensions of the surface active agents with a hydrocarbon or, respectively, perfluorinated structure having the corresponding end groups.

Moreover, the results of the studies also explain the synergistic effect of small quantities, corresponding to the order of p.p.m., of fluorinated surfactants having a —$CF_3$ end group in altering the surface tension of conventional surfactants solutions having a hydrocarbon structure below the limit surface tension thereof when they are in the pure state (25 dynes/cm).

Recently, it has been demonstrated that it is possible to obtain a lowering of the surface tension of water below the limit 25 - 27 dynes/cm using surfactants which have no fluorinated water-repellent end groups and which consist of molecules having a polyoxaperfluoroalkanic structure and hydrophilic polar end groups (La Chimica e l'Industria 55, 208, 1973).

The surfactants of that new class have a structure corresponding to the formula (I):

wherein the units —$CF_2CF_2O$— and $CF_2O$— are distributed randomly along the chain, and 1 and n are integers the sum of which ranges from 2 to 50 and the $1/n$ ratio is comprised between 0.2 and 1.5

The polyoxaperfluoroalkandioic acids corresponding to formula (I) are obtained in the form of mixtures of homologs of series (I), by reducing cleavage of the polyperoxy perfluoropolyethers resulting from the photo-oxidation of TFE (tetrafluoroethylene) in the liquid phase, as described in U.S. Pat. No. 3,847,978 issued Nov. 12, 1974.

THE PRESENT INVENTION

There has now been found a new class of surfactants the chain of which, with a structure of bis-alkylamides of polyoxaperfluoro-alkandioic acids, has the general formula (II):

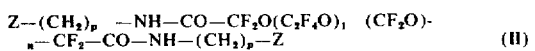

wherein Z is a group

a salified quaternary ammonium group or a group

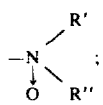

—$C_2F_4O$— and —$CF_2O$— are oxyperfluoro-alkylene units distributed randomly along the chain, 1 and n are integers the sum of which ranges from 2 to 50, preferably from 4 to 20, the $1/n$ ratio is comprised between 0.2 and 1.5, p is an integer comprised between 1 and 20, preferably between 2 and 6, R' and R'' are alkyl radicals, either the same or different and having from 1 to 6 carbon atoms or forming, together with the adjacent nitrogen atom, a ring with 5 to 6 atoms, the remaining atoms of the ring consisting of atoms of carbon only or of carbon atoms and one oxygen atom, and O is an oxygen atom.

Representative compounds, which can be used also as anti-corrosion agents for metals in neutral or acid electrolytic solutions, are the N,N'-bis-dialkylamino alkyl amides of the polyoxaperfluoroalkandioic acids having the general formula (III):

III. 

wherein R', R'', p, 1 and n have the same meaning as in formula (II). When the group

forms a ring with 5 or 6 atoms, this represents heterocyclic rings like piperidine, pyrrolidine, oxazolidine, morpholine, etc.

The process for preparing surfactants having the general formula (III) is characterized in that the methyl esters or acylic halides (preferably chlorides or fluorides) of the polyoxaperfluoroalkandioic biacids represented by formula (I) are reacted with an alkylene diamine having the general formula:

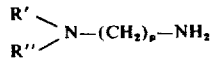

wherein R' and R'' are alkyl radicals either the same or different and having from 1 to 6 carbon atoms or form together with the adjacent nitrogen atom a ring with 5 or 6 atoms, the remaining atoms of the ring being carbon atoms or carbon atoms and one oxygen atom, and p is an integer ranging from 1 to 20.

Both the acyl esters and fluorides of the acids according to formula (I) can be obtained by reducing cleavage, as described in U.S. Pat. No. 3,847,978 of the polyperoxy perfluoropoly-ethers obtained from the photo-oxidation of tetrafluoroethylene as described in U.S. Pat. No. 3,715,378 and in "La Chimica e l'Industria", 55, 208 (1973).

The mixture of acid diesters or difluorides obtained from the reducing cleavage of the polyperoxy perfluoropolyethers is fractionated by fractional distillation or by precipitation with solvent/non-solvent systems in mixtures having a reduced molecular weight so as to fall within the range n+1 defined above. Preferred starting materials are the carboxylic intermediates in the form of diesters. The fractions of perfluoropolyether diesters with a narrow molecular weight distribution are reacted with diamines such as N,N-diethylaminoethandiamine; N,N-diethyl-1,3-propandia-mine, N,N-di-n-propyl-1,3, propandiamine; N,N-diisopropyl-1,3-propandiamine; N,N-diethyl-1,4-butandiamine; N,N-diethyl-1,5-pentandiamine, N,N-diethyl-1,6-hexan-diamine, 1-(2-amino ethyl) piperidine; 1-(2-amino ethyl)morpholine; 1-(4-amino butane) piperidine; 1-(3-amino propane) pyrrolidine.

In the preferred embodiment, the amines of formula (III) are obtained by reacting the methyl esters of polyoxyperfluoroalkandioic acids (I) with the diamines of the type mentioned above, in the stoichiometric ratio of 1:2 or in excess over the stoichiometric ratio, either in the absence or in the presence of organic liquids such as ethyl ether or mixtures thereof with 1,1,2-trichlo-rotrifluoroethane.

The N,N'-bis-(aminoalkyl)amides of the polyoxaperfluoroalkandioic acids described in formula (III) have valuable properties as surfactants soluble in organic liquids such as aliphatic or aromatic hydrocarbons, halogenated aliphatics, alcohols, ketones, mineral and vegetable oils, they are also soluble and stable in acid electrolytic media like sulfuric and hydrochloric acid in various concentrations. They have excellent properties as anti-corrosion agents for metals with respect to neutral or acid electrolytic media like sulfuric and hydrochloric acid in various concentrations. They have excellent properties as anti-corrosion agents for metals with respect to neutral or acid electrolytic solutions of oxidizers or reducers.

The compounds of class (III) can react with molecules containing an active halogen such as alkyl halides or alpha-alkylaryl halides, e.g., the iodides or bromides of methyl, ethyl, n-propyl, n-butyl, benzyl, or such as acid alpha-halogens, e.g., alpha-chloroacetic acid, giving place, with quaternary nitrogen, to compounds having the general formula:

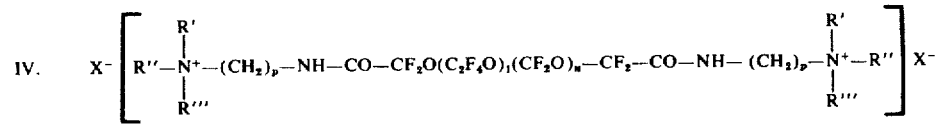

wherein 1, n, p, R', R'' have the same meaning as stated above, R''' is an alkyl, alpha-alkylaryl or methylcarboxylic group; X is a halogen atom such as chlorine, bromine or iodine. The compounds of the new class of the quaternary ammonium-alkylperfluoroamidic salt type are surfactants which are soluble in water, alcohols and ketones and solutions of neutral or acid concentrated electrolytes such as sodium chloride, sulfuric and hydrochloric acid; moreover, they are soluble in soda. They have excellent properties as flotation agents. The amphoteric compounds with quaternary nitrogen, corresponding to formula (IV), obtained when R''' is a methyl carboxylic group, are surfactants which are soluble in water, alcohols, ketones, and insoluble in hydrocarbon solvents. They are soluble in bases and acids; in a basic medium, the carboxylic group is dissociated while in an acid medium the carboxylic group is undissociated. In aqueous solutions, at the isoelectric point, the structure of the amphoteric compound corresponds to formula (V);

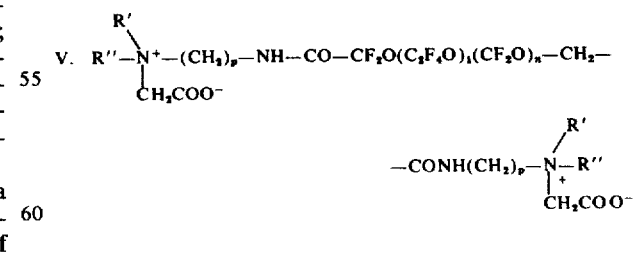

They show excellent oil-repellent properties when they are used as impregnating agents for linen or cotton-based fabrics.

The bis-amino-dialkyl-amides according to formula (III) are converted by reaction with hydrogen peroxide and acyl hydroperoxides, into oxides of the amines having the formula:

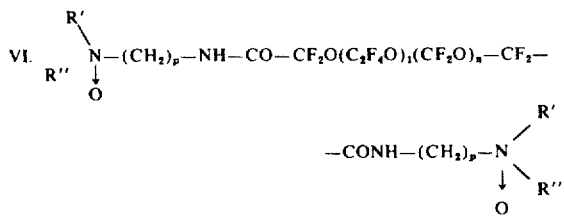

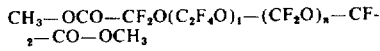

Said compounds are agents which exhibit surface activity, are soluble in water, alcohols, ketones and insoluble in solvents having a hydrocarbon structure. They are also anti-corrosion agents for metals against acid and oxidizing electrolytic agents.

The following examples are given merely by way of illustration and are not meant to limit the possibilities of practicing the process according to the invention.

EXAMPLE 1

The starting material for obtaining the surfactant materials described in this application consisted of a mixture of methyl diesters of the perfluoropolyoxaalkandioic acids corresponding to formula (I), obtained as described in U.S. Pat. No. 3,847,978 by reduction of polyperoxy perfluoroethers in a methanolic medium and containing 2.15% by weight of active oxygen, and having an average equivalent weight of 500, and consisting of homologs of the series with an equivalent weight ranging from 150 to 1600, and characterized by a $C_2F_4O/CF_2O$ units ratio of about 0.8. Under I.R. spectroscopy, the perfluoro polyether esters were characterized by a very intense and clearcut absorption band in the zone of 1790 cm$^{-1}$, corresponding to the carbonyl group, and by a less intense band in the zone of 3000 cm$^{-1}$ corresponding to the CH bonds.

A sample of 2 Kg of the mixture was subjected to fractional distillation through a Vigreux column corresponding to 5 theoretical plates, keeping a reflux ratio of 5. There were thus separated, by distillation between 60°C and 80°C, under an absolute pressure of 1 mm Hg, 300 g of diesters with an average equivalent weight of 320, d$_4^{20}$ = 1.63, refraction index n$_D^{20}$ = 1.3521 and consisting of products having an equivalent weight ranging from 250 to 380. By distillation between 110°C and 120°C under an absolute pressure of about 0.05 mm Hg there were separated 200 g of diesters with an average equivalent weight of 650, d$_4^{20}$ = 1.72, n$_D^{20}$ = 1.3495 consisting of products having an equivalent weight ranging from 550 to 750.

Finally, the fraction was collected (50 g) which was distilled between 130°C and 150°C under a pressure of 1×10$^{-3}$ mm Hg and which had an average equivalent weight of 800 and d$_4^{20}$ = 1.75 and consisting of products with an equivalent weight ranging from 760 to 950.

The equivalent weights were determined by alkaline saponification and volumetric titration. The range of composition of the narrower fractions was determined by fractional precipitation from the solutions of the two 5% fractions in 1,1,2-trichlorofluoroethane by addition of portions of methanol as precipitating medium.

EXAMPLE 2

A pyrex glass flask having a 250 ml capacity and equipped with a dropping funnel, a reflux condenser and a magnetic stirrer, was fed with a sample of 32 g of a mixture of methyl diesters having the formula:

$$CH_3-OCO-CF_2O(C_2F_4O)_l-(CF_2O)_n-CF_2-CO-OCH_3$$

and an average equivalent weight of 320, wherein the 1/n ratio was unitary, obtained as described in Example 1. 100 ml of anhydrous ethyl ether were added in order to solubilize the diesters, and 13.9 g of N,N-diethyl ethandiamine were added to the ether solution. The mixture was reacted for 2 hours at 25°C under stirring, then the reflux condenser was replaced by a Liebig condenser and ethyl ether and methanol released by the reaction were distilled off. The excess of diamine which was present was then distilled under vacuum of 1 mm Hg at a temperature ranging from 50° to 80°C.

As a distillation residue there were obtained 40 g of a colorless, viscous liquid which by I.R. spectroscopy was found to be characterized by the displacement of the carbonyl band to the zone of 1720 cm$^{-1}$ and by the appearance of the band relevant to the NH bond in the zone of 3200 cm$^{-1}$. The liquid had a refraction index n$_D^{20}$ = 1.3799 and a density d$_4^{20}$ = 1.405. The compound had the structure of formula (III) wherein p=2 and R'=R''=C$_2$H$_5$. The obtained compound was soluble in organic solvents like heptane, benzene, toluene, xylene, perchloroethylene, isopropanol, acetone; insoluble in water and in neutral and basic aqueous electrolysis solutions, while it was soluble without any decomposition in H$_2$SO$_4$ in the various concentrations ranging from 5 to 95%. The compound lowered the surface tension of perchloroethylene to 26 dynes/cm in its 1% solutions and concentrations as measured at 20°C with the Du Nauy tensiometer. When dissolved in a 1% solution in 10% H$_2$SO$_4$, the compound lowered the surface tension of the solution to 25 dynes/cm.

The compound was shown to be an anti-corrosion agent for metals pretreated with the compound and immersed in acid electrolytic media. An iron plate having the dimensions 68 × 12.7 × 2 mm was immersed for 10 minutes in a 0.5% solution of the compound dissolved in perchloroethylene. After evaporation of the solvent it was completely dipped into a 400 ml glass containing a 10% HCl solution kept under stirring by means of a polypropylene stirrer. After a stay of 72 hours at 25°C, the dried plate appeared to have lost only 0.1% of its weight, while in a blank test carried out under the same conditions on a non-pre-treated plate, an attack corresponding to 3% of the plate weight was determined.

EXAMPLE 3

Operating similarly to Example 2, a product having the formula (III) wherein p=3 and R'=R''=C$_2$H$_5$ was obtained from a sample of the same diester having an average equivalent weight of 320, and an 1/n ratio of 1, by reaction with N,N-diethyl-1,3-propandiamine.

By I.R. spectroscopy the product was characterized by absorption bands at 1720 cm$^{-1}$ and 3200 cm$^{-1}$. It had a refraction index n$_D^{20}$ =1.3856 and a density d$_4^{20}$ =1.42, and was soluble in n-heptane, toluene, xylene, alcohols, acetone, perchloroethylene, and in H$_2$SO$_4$. The surface tension of the 1% solution in perchloroethylene appeared to be 20.9 dynes/cm, while the 1% solution in 10% H$_2$SO$_4$ showed a surface tension of 21 dynes/cm.

EXAMPLE 4

Operating as in Example 2, and starting from a sample of 32.5 g of a diester with an average equivalent weight of 650 and an $1/n$ ratio of about 0.8 that was prepared as described in Example 1, there was obtained, by reaction with 15 g of N,N-diethyl-1,3- propandiamine, 37 g of a liquid characterized by I.R. absorption bands at 1720 and 3200 cm$^{-1}$, by a refraction index $n_D^{20}$ =1.3612. The structure corresponded to formula (III) wherein p=3 and R'=R''=—C$_2$H$_5$.

EXAMPLE 5

A sample of 20 g of N,N'-bis-diethyl-aminoethylamide having a molecular weight of 808 and an $1/n$ ratio of 1 prepared according to Example 2 was dissolved in 50 ml of ethanol and reacted with 7.75 g of ethyl iodide for a period of 2 hours.

At the end of the 2 hour reaction, ethyl alcohol was evaporated under vacuum of 15 mm Hg at a temperature of 40°C and there were obtained as a residue 27.5 g of a waxy, colorless compound which was soluble in water, alcohols, acetone and sulfuric acid, and insoluble in hydrocarbons, perchloroethylene and soda. The elemental analysis determined an iodine content of 22.6% (theoretical 22.68%); consequently, it was possible to attribute the compound the structure corresponding to the formula (IV) wherein p=2, R'=R''=λ R'''=—C$_2$H$_5$ and X$^-$ = I$^-$. The compound dissolved at a 1% concentration in water caused the surface tension to decrease to 23 dynes/cm; at a 1% concentration in 10% sulfuric acid it caused a surface tension decrease to 22 dynes/cm, while at a 1% concentration in 10% NaCl it caused a surface tension decrease to 21 dynes/cm.

EXAMPLE 6

A sample of 15 g of N,N'-bis-diethylamino-propylamide having a molecular weight of 1496 and an $1/n$ ratio of about 0.8 prepared according to Example 4, was reacted in a 50 ml ethanol solution with 2.19 g of ethyl bromide for 2 hours at 25°C. After evaporation of the solvent, there were obtained as a residue 17 g of very viscous, yellow liquids, characterized by a density $d_4^{20}$ =1.54 and a bromine content of 9.3% (theoretical 9.34%). Consequently, it was possible to attribute to the compound the structure of formula (IV) wherein p=3, R'=R''=R'''=—C$_2$H$_5$ and X$^-$ = Br$^-$.

EXAMPLE 7

A sample of 15 g of N,N'-bis-diethylaminopropylamide having a molecular weight of 1496 and an $1/n$ ratio of about 0.8 obtained according to Example 4, dissolved in 100 ml anhydrous ether, was reacted with 1.9 g of alpha-chloroacetic acid for 3 hours at a temperature of 25°C. the ethyl ether was then evaporated and the residue was kept at a temperature of 100°C under vacuum of 1 mm Hg for 3 hours. 16 g of a waxy, colorless product were obtained, the I.R. absorption spectrum of which was characterized by a new clearcut band at 1590 cm$^{-1}$ attributable to the carboxylic ion. The refraction index was $n_D^{20}$=1.3961. in the product, no chlorine was found present upon elemental analysis; consequently, the attributable structure corresponded to formula (V) wherein p=3, R'=R''=C$_2$H$_5$.

The product was soluble in water, alcohols, acetone and in solutions of acids and bases; it was insoluble in hydrocarbons. A 3% water-solution of the product was prepared and used to impregnate a piece of cotton fabric having the dimensions 10 × 10 cm. The impregnated fabric was then dried by keeping it in a ventilated oven at 100°C for 2 hours.

The thus prepared sample was subjected to the Standard Oil Repellency Test, cfr. J. N. Simons "Fluorine Chemistry", Academic Press, New York, Vol. V, page 103, thus determining a repellency toward the 40% (by vol.) n-heptane and 60% (by vol.) nujol oil mixture, corresponding to a repellency rate value of 80, which indicated fair stain-repellent properties of the treated fabric.

EXAMPLE 8

A sample of 16.7 g of N,N'-bis-diethylaminopropylamide having a molecular weight of 836 and an $1/n$ ratio of 1 prepared according to Example 3, was suspended in 30 ml water and 15 ml of 30% hydrogen peroxide were added thereto. The mixture was reacted under stirring for 3 hours at 75°C up to complete dissolution. The excess of reactant and solvent was evaporated by heating to 50°C under vacuum of 15 mm Hg, obtaining as a residue a very viscous, colorless liquid.

The I.R. spectrum was characterized by a broad absorption band in the zone of 1675 cm$^{-1}$. The product was soluble in water and insoluble in n-heptane, in contrast to the starting product, and characterized by a refraction index $n_D^{20}$=1.4061. It was possible to attribute to the compound the formula (VI), wherein p=3, R'=R'=C$_2$H$_5$.

A 1% water solution of the amido-amino-oxide compound had a surface tension of 24 dynes/cm. The compound proved to be an anticorrosion agent for metals pre-treated with it and immersed in acid electrolytic media.

An iron plate having the dimensions 68 × 12. 7 × 2 mm was immersed for 10 minutes in a 0.2% solution of the compound in perchloroethylene. After solvent evaporation, it was completely dipped into a 400 ml glass containing a 10% HCl solution kept under stirring by means of a polyproylene stirrer.

After a stay of the plate for 7 days at 25°C the dried plate was found to have lost only 0.6% of its weight while in a blank test carried out under the same conditions on a plate which had not been pre-treated with the compound, the attack corresponded to 28% of the plate weight.

EXAMPLE 9

Operating similarly to Example 2, and starting from a sample of 32 g of the diester having an average equivalent weight of 800 and an $1/n$ ratio of about 0.8 that was prepared as described in Example 1, there were obtained, by reaction with 5.2 g of N,N-diethyl-1,3 propandiamine, 35.9 g of a liquid characterized by I.R. absorption bands at 1720 and 3200 cm$^{-1}$, by a refraction index $n_D^{20}$ =1.3496. The structure corresponded to formula (II) wherein p=3 and R'=R''=—C$_2$H$_5$.

1.9 of alpha-chloroacetic acid were added to 18 g of the obtained product, dissolved in 100 ml of anhydrous ether, and the whole was allowed to react for 4 hours at 25°C. The ether was then evaporated and the residue was kept at a temperature of 100°C under vacuum of 1 mm Hg for 3 hours. A waxy product was obtained, which was characterized by a new I.R. absorption band at 1590 cm and by a refraction index $n_D^{20}$ =1.3790. In the product, no chlorine was found present upon elemental analysis, and consequently the product was atrributed the structure of formula (V) wherein $p=3$, $R'=R''=-C_2H_5$.

A piece of cotton fabric was impregnated with a 3% ethyl alcohol solution of the product and then, after evaporation of the solvent, the impregnated sample was subjected to the Standard Oil Repellency Test, thus determining a repellency towards the 50% (by vol.) n-heptane and 50% (by vol) nujol oil mixture corresponding to the repellency rating value of 100, which indicated excellent stain repellent properties.

What we claim is:

1. Surface active agents having anti-corrosion or oil-repellent properties, the chain of which, having the structure of bis-alkyl-amides of polyoxaperfluoroalkandioic acids, corresponds to the general formula:

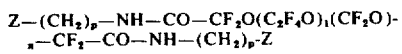

wherein Z is a

group, a salified quaternary ammonium group or a

group, $-C_2F_4O-$ and $-CF_2O-$ are oxyperfluoroalkylene units distributed randomly along the chain, l and n are integers the sum of which is from 2 to 50 inclusive and the $1/n$ ratio is from 0.2 to 1.5, inclusive, p is an integer from 1 to 20, inclusive, R' and R'' are alkyl radicals either the same or different and having from 1 to 6 carbon atoms or form, together with the adjacent nitrogen atom, a ring with 5 or 6 atoms, the remaining atoms of the ring consisting of atoms of carbon or of carbon and one oxygen atom, and O is an oxygen atom.

2. Surface active agents according to claim 1, in which, in the formula given, the sum of l and n is from 4 to 20, inclusive.

3. Surface active agents according to claim 1, in which, in the formula given, p is an integer from 2 to 6, inclusive.

4. Surface active agents according to claim 1, in which, in the formula given, the sum of l plus n is from 4 to 20, inclusive, and p is an integer from 2 to 6, inclusive.

5. Surface active agents according to claim 1, wherein

Z is 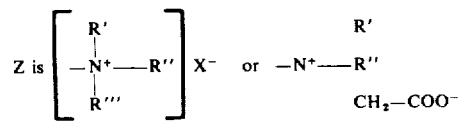

wherein R' and R'' are as defined in claim 1, R''' is an alkyl or alphaalkylaryl group and X is a chlorine, bromine or iodine atom.

6. Process for preparing the surface active agents of claim 1, wherein Z is a

group, characterized in that the methyl esters or acylic halides of polyoxaperfluoroalkandioic biacids having the general formula:

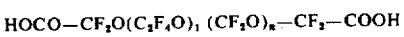

wherein the $-CF_2-CF_2-O-$ and $-CF_2O-$ units are distributed randomly along the chain, and l and n are integers the sum of which is from 2 to 50 inclusive and the $1/n$ ratio is from 0.2 to 1.5 inclusive, are reacted with an alkylene diamine having the general formula:

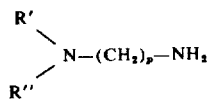

wherein R' and R'' are alkyl radicals either the same or different and have from 1 to 6 carbon atoms or form, together with the adjacent nitrogen atom, a ring with 5 or 6 atoms, the remaining atoms of the ring consisting of atoms of carbon only or of carbon and one oxygen atom, and p is an integer of from 1 to 20, inclusive.

7. Process according to claim 6, wherein the methyl esters and the acylic halides of the polyoxaperfluoroalkandioic acids are reacted with the diamines with molar ratios of 1:2 to 1:4.

8. Process according to claim 6, wherein the methyl esters of the acids are reacted with the amines in the stoichiometric ratio of 1:2, in the presence of organic solvents.

9. Process for preparing surface active agents according to claim 1, wherein Z is a salified quaternary ammonium group, characterized in that the N,N'-bis-dialkylamino alkylamide compounds having the general formula:

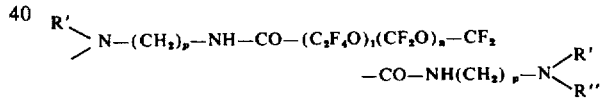

are reacted with an alkyl or alpha-alkylaryl halide in which the halogen is bromine or iodine, or with alphachloroacetic acid.

10. Process for preparing surface active agents according to claim 1, wherein Z is a

group, characterized in that the N,N'-bis-dialkyl-amino alkylamide compounds having the general formula:

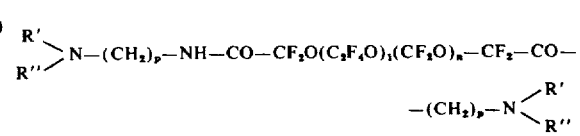

are reacted with hydrogen peroxide, hydroperoxides or acylhydroperoxides.

* * * * *

UNITED STATES PATENT AND TRADEMARK OFFICE
CERTIFICATE OF CORRECTION

PATENT NO. : 3,944,610
DATED : March 16, 1976
INVENTOR(S) : Gerardo CAPORICCIO et al It is certified that error appears in the above-identified patent and that said Letters Patent are hereby corrected as shown below:

Col. 6, line 56 (Example 3)   "R' = R"- $C_2H_5$" should be - - - R' = R" = $-C_2H_5$ - - -.

Col. 7, line 29 (Example 5),   "p=2, R'=R" = $\neq$ R"' - $C_2H_5$" should be - - - p=2, R'=R"=R"' = $-C_2H_5$ - - -.

Col. 9, line 1, "atrributed" should be - - - attributed - - -.

Col. 10, line 40 (Claim 9), "$\begin{array}{c}R' \\ \diagdown \\ \diagup \end{array}N-$ at the beginning of the

UNITED STATES PATENT OFFICE
CERTIFICATE OF CORRECTION

Patent No. 3,944,610  Dated March 16, 1976

Inventor(s) Gerardo Caporiccio et al.

It is certified that error appears in the above-identified patent and that said Letters Patent are hereby corrected as shown below:

structural formula should be

Signed and Sealed this

Seventh Day of March 1978

[SEAL]

Attest:

RUTH C. MASON  LUTRELLE F. PARKER
*Attesting Officer*  *Acting Commissioner of Patents and Trademarks*

UNITED STATES PATENT OFFICE
CERTIFICATE OF CORRECTION

Patent No. 3,944,610  Dated March 16, 1976

Inventor(s) Gerardo CAPORICCIO et al

It is certified that error appears in the above-identified patent and that said Letters Patent are hereby corrected as shown below:

<u>Col. 6</u>, <u>line 56</u>, <u>(Example 3)</u>, "R'=R"- $C_2H_5$" should be - - - R'=R"=-$C_2H_5$ - - -.

<u>Col. 7</u> - <u>lines 28-29</u> <u>(Example 5)</u> "p=2,R'=R"= λ R"'- $C_2H_5$" should be - - - p=2,R'=R"=R"'=-$C_2H_5$ - - -.

<u>Col. 9</u>, <u>line 1</u>, "atrributed" should be - attributed - - -.

UNITED STATES PATENT OFFICE
CERTIFICATE OF CORRECTION

Patent No. 3,944,610      Dated   March 16, 1976

Inventor(s)   Gerardo CAPORICCIO et al

It is certified that error appears in the above-identified patent and that said Letters Patent are hereby corrected as shown below:

Col. 10, line 40, (Claim 9) "$R'\!\!\!\diagdown\!\!\!\!\diagup\!\!\!\!N-$" at the beginning of the structural formula should be --- $\begin{array}{c}R'\!\diagdown\\[-2pt]\phantom{R'}\diagup\!N-\\[-2pt]R''\end{array}$ ---.

This certificate supersedes Certificate of Correction issued March 7, 1978.

Signed and Sealed this

Seventeenth Day of July 1979

[SEAL]

Attest:

LUTRELLE F. PARKER
Attesting Officer    Acting Commissioner of Patents and Trademarks